(12) United States Patent
Matsumura et al.

(10) Patent No.: US 10,175,632 B2
(45) Date of Patent: Jan. 8, 2019

(54) POWER SUPPLY AND IMAGE FORMING APPARATUS

(71) Applicant: CANON KABUSHIKI KAISHA, Tokyo (JP)

(72) Inventors: Ryo Matsumura, Kawasaki (JP); Hiroshi Yadoiwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/892,237

(22) Filed: Feb. 8, 2018

(65) Prior Publication Data

US 2018/0164735 A1 Jun. 14, 2018

Related U.S. Application Data

(63) Continuation of application No. 15/157,259, filed on May 17, 2016, now Pat. No. 9,933,744.

(30) Foreign Application Priority Data

May 29, 2015 (JP) ................................. 2015-110371

(51) Int. Cl.
*H02J 1/00* (2006.01)
*G03G 15/00* (2006.01)
*G03G 21/20* (2006.01)
*H02M 3/158* (2006.01)

(52) U.S. Cl.
CPC ........... *G03G 15/80* (2013.01); *G03G 21/206* (2013.01); *H02M 3/158* (2013.01)

(58) Field of Classification Search
CPC ...... H02M 3/158; G03G 21/206; G03G 15/80
See application file for complete search history.

(56) References Cited

U.S. PATENT DOCUMENTS

| 6,346,800 | B1* | 2/2002 | Mano ..................... G03G 15/20 323/225 |
|---|---|---|---|
| 2007/0212103 | A1* | 9/2007 | Kikuchi ............. G03G 15/0283 399/88 |
| 2011/0081160 | A1* | 4/2011 | Yoon .................. G03G 15/5004 399/88 |
| 2013/0166926 | A1* | 6/2013 | Yamamizu ......... G03G 15/5079 713/300 |
| 2015/0002885 | A1* | 1/2015 | Takahashi .......... G03G 15/5004 358/1.14 |
| 2015/0022162 | A1* | 1/2015 | Kim ................... G03G 15/5004 320/166 |

* cited by examiner

*Primary Examiner* — Jared Fureman
*Assistant Examiner* — Duc M Pham
(74) *Attorney, Agent, or Firm* — Canon U.S.A., Inc. IP Division

(57) ABSTRACT

A power supply includes a first switching unit, a power restriction unit connected between the first switching unit and a load, a second switching unit connected between the power restriction unit and the load, a controller configured to output a control signal to the first switching unit and the second switching unit, and an adjusting unit configured to adjust input of the control signal to the second switching unit, and the second switching unit is operated selectively in accordance with the control signal.

15 Claims, 4 Drawing Sheets

POWER SUPPLY AND IMAGE FORMING APPARATUS

CROSS REFERENCE TO RELATED APPLICATIONS

The present application is a continuation of U.S. patent application Ser. No. 15/157,259, filed May 17, 2016, entitled "POWER SUPPLY AND IMAGE FORMING APPARATUS", the content of which is expressly incorporated by reference herein in its entirety. Further, the present application claims priority from Japanese Patent Application No. 2015-110371, May 29, 2015, which is also hereby incorporated by reference herein in its entirety.

BACKGROUND OF THE INVENTION

Field of the Invention

The present invention relates to a power supply, and particularly to a step-down power supply capable of changing an output voltage in a wide range and supplying power to a load.

Description of the Related Art

In general, a fan used in an electronic device has, in terms of noise, the function of changing the rotation speed thereof in accordance with an operation mode of the device. Control is performed such that the rotation speed of the fan is increased and cooling of the inside of the device is prioritized when the device is being operated, and the rotation speed of the fan is reduced to reduce noise when the device is on standby. In general, the rotation speed of a fan changes in accordance with a supplied voltage. Thus, as a power supply that drives a fan, a step-down power supply is used that is capable of changing an output voltage in a wide range (see Japanese Patent Laid-Open No. 2007-116804).

In the case where an output voltage is not changed, a power supply circuit in Japanese Patent Laid-Open No. 2007-116804 performs a switching operation in a frequency range in which certain power supply efficiency is achieved by feedback control. In contrast, in the case where the output voltage is changed, a switching operation is performed using a switching-frequency control table based on setting voltages. Here, it is known that in the case where the output voltage is changed in a wide range with a less expensive configuration and where a load does not require high voltage accuracy, control is performed using a switching control table based on setting voltages, without performing feedback control.

In the following, a conventional step-down power supply circuit described above will be described with reference to FIG. 5A. This power supply circuit is comprised of a switch circuit and an output circuit. The switch circuit switches on and off switching elements Q1 and Q2 using an FPWM signal. A direct input voltage Vin input to an input terminal is then converted into a periodic pulsed-wave signal Vpulse. This signal is smoothed by an output circuit comprised of a diode D2, an inductor L1, and a capacitor C1, and is output to an output terminal as an output voltage Vout. In this circuit, without performing feedback control, an output voltage is changed by changing the pulse width of the FPWM signal.

Here, a circuit as illustrated in FIG. 5B and in which a resistor R3 is used instead of the diode D2 and the inductor L1 in the output circuit has conventionally been used. In this circuit, the periodic pulsed-wave signal Vpulse output from the switch circuit is smoothed by the resistor R3 and a capacitor C1, and is output as an output voltage Vout. Similarly to as in the circuit of FIG. 5A, an output voltage is also able to be changed by changing the pulse width of an FPWM signal in this circuit.

In addition, in the case where an output voltage is adjusted to a constant value and where a load requires high voltage accuracy, a circuit as illustrated in FIG. 5C has conventionally been used. In this circuit, the output voltage is able to be switched between two types of voltage: a voltage close to the level of the input voltage (hereinafter referred to as input-voltage level), and a voltage lower than the input-voltage level. In the case where the voltage close to the input-voltage level is output, the voltage is output by setting an F_ON signal to High and switching on switching elements Q3 and Q4. In the case where the voltage lower than the input-voltage level is output, the voltage is output with high voltage accuracy by setting an F_H_ON signal to High, switching on switching elements Q1 and Q2, and conducting a Zener diode ZD2. Regarding paths for these two output voltages, a control signal and a control signal line are necessary for each of the paths in this circuit.

However, the inductor L1 used in the conventional art illustrated in FIG. 5A is arranged on a route through which power is supplied to a load, and thus a large part needs to be used, thereby increasing the circuit in size. In contrast, in the conventional art illustrated in FIG. 5B and that does not use the inductor L1, it is difficult to output a desired voltage because of a voltage drop in the resistor R3 in the case where the output voltage close to the input-voltage level is requested. It is possible to output a voltage close to the input-voltage level by increasing the number of control signal lines and the number of dedicated output lines as in the circuit illustrated in FIG. 5C; however, there is a problem in that when the number of output control signals is increased, the number of necessary CPU pins is increased.

SUMMARY OF THE INVENTION

The present invention makes it possible to provide, without increasing the number of control signals, a power supply capable of outputting a voltage in a wide range with a simple configuration.

The present invention provides a power supply including a first switching unit configured to perform switching for an input voltage, a power restriction unit connected between the first switching unit and a load, a second switching unit connected between the power restriction unit and the load and configured to perform switching for the input voltage, a controller configured to output a control signal to the first switching unit and the second switching unit, and an adjusting unit configured to adjust input of the control signal to the second switching unit, and the controller operates the second switching unit selectively in accordance with the control signal.

In addition the present invention provides an image forming apparatus including an image forming unit configured to form an image, and a power supply configured to supply power for forming an image, the image being formed by the image forming unit, the power supply including a first switching unit configured to perform switching for an input voltage, a power restriction unit connected between the first switching unit and a load, a second switching unit connected between the power restriction unit and the load and configured to perform switching for the input voltage, a controller configured to output a control signal to the first switching unit and the second switching unit, and an adjusting unit configured to adjust input of the control signal to the second switching unit, and the controller operates the second switching unit selectively in accordance with the control signal.

Further features of the present invention will become apparent from the following description of exemplary embodiments with reference to the attached drawings.

DESCRIPTION OF THE EMBODIMENTS

First Embodiment

Figure 1:
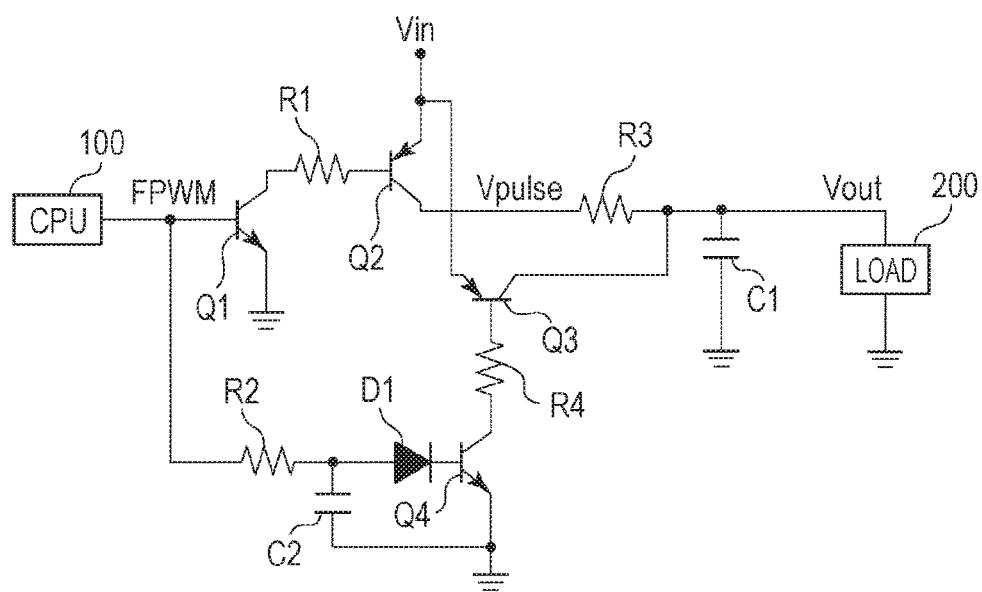
FIG. 1 is a circuit diagram of a step-down power supply according to a first embodiment.

FIG. 1 is a circuit diagram of a step-down power supply device according to a first embodiment. Note that elements the same as those of the conventional art will be denoted by the same reference numerals, and description thereof will be omitted. In FIG. 1, a pulse width modulation signal FPWM (hereinafter referred to as FPWM signal) from a central processing unit (CPU) 100 serving as an output-control-signal generation unit is output to a control terminal of a switching element Q1 and a resistor R2. The resistor R2 is connected between the CPU 100 and the anode terminal of a diode D1, and a capacitor C2 is connected between the resistor R2 and GND and between the anode terminal of the diode D1 and GND. The FPWM signal output from the CPU 100 is converted by the resistor R2 and the capacitor C2 into a direct-current voltage corresponding to the pulse width, and a control signal is generated for switching on and off a second switch circuit. The anode terminal of the diode D1 is connected to the resistor R2 and the capacitor C2, and the cathode terminal of the diode D1 is connected to a control terminal of a switching element Q4. This is provided to adjust a voltage at which the second switch circuit is switched on using a forward direction voltage of the diode D1. Note that transistors are used as the switching elements Q1, Q2, and Q4 and a switching element Q3 in the present embodiment. Here, in the present embodiment, the switching elements Q3 and Q4 serving as a second switching unit are selectively operated in accordance with the FPWM signal. Details of an operation will be described in the following.

In FIG. 1, the CPU 100 stores, in an internal read-only memory (ROM) (not illustrated), a control table in which ON periods and OFF periods of the FPWM signal corresponding to setting voltages are stored. It is then possible to change an ON time period of the FPWM signal in accordance with data regarding the ON periods and OFF periods stored in the control table. In the case where a voltage lower than an input voltage is to be output, the CPU outputs an output control signal FPWM having a small pulse width (a short ON time period). Here, this output control signal FPWM is input to and smoothed by the resistor R2 and the capacitor C2, and the resulting voltage is lower than the forward direction voltage of the diode D1. The switching elements Q3 and Q4 of the second switch circuit are thus not switched on. That is, the diode D1 serves as a unit that adjusts the operation of the second switch circuit in accordance with the output control signal FPWM from the CPU 100. In contrast, the switching elements Q1 and Q2 of a first switch circuit serving as a first switching unit, to which the output control signal FPWM is input, are switched on and off repeatedly. As a result, an input voltage Vin is converted into a periodic pulsed-wave signal Vpulse. This signal Vpulse is smoothed by a resistor R3 and a capacitor C1, and is output as an output voltage Vout (a first voltage).

In the case where a voltage close to the input voltage (a second voltage almost equal to the input voltage) is to be output, the CPU 100 outputs an output control signal FPWM having a large pulse width (a long ON time period). Here, this output control signal FPWM is input to and smoothed by the resistor R2 and the capacitor C2, and the resulting voltage is higher than the forward direction voltage of the diode D1. The switching elements Q3 and Q4 of the second switch circuit are thus switched on. In contrast, the switching elements Q1 and Q2 of the first switch circuit, to which the output control signal FPWM is input, are switched on and off; however, a current does not flow through the switching element Q2 of the first switch circuit. As a result, the voltage close to the input voltage is output as the output voltage Vout from the switching element Q3 of the second switch circuit. This is because the resistor R3, a power restriction element, is provided on the power supply route of the first switch circuit, and the power supply route of the second switch circuit has a smaller impedance.

Figure 2:
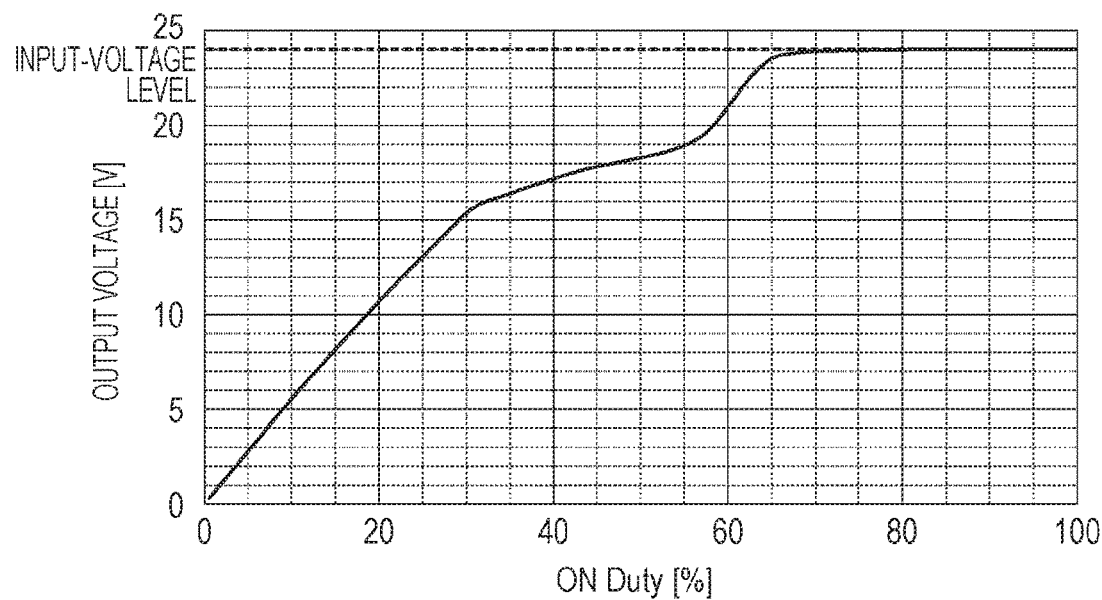
FIG. 2 is a diagram illustrating an output voltage obtained when the pulse width of a pulse width modulation signal is changed in the power supply of the first embodiment.

FIG. 2 is a diagram illustrating an output voltage obtained when the pulse width of the FPWM signal is changed in the circuit of the power supply device of the first embodiment. The horizontal axis represents the percentage of the ON time period of the FPWM signal (hereinafter also referred to as ON Duty), and the vertical axis represents the output voltage Vout. This shows that the output voltage Vout increases as the ON Duty of the FPWM signal increases. The switching elements Q3 and Q4 of the second switch circuit start switching on and off at the point in time when the ON Duty exceeds 55%, the switching element Q3 and Q4 of the second switch circuit enter an ON state at the point in time when the ON Duty exceeds 65%, and the voltage close to the input voltage is output, the input voltage being 24 V.

For example, a fan that cools the inside of an apparatus is able to be applied as a load 200 in FIG. 1. In the case where it is desired to reduce the sound of the fan, the ON Duty of the FPWM signal is set to 20%, and approximately a voltage of 11 V is supplied to the fan, thereby reducing the rotation speed of the fan. In addition, in the case where the cooling function of the fan is prioritized, the ON Duty of the FPWM signal is set to 100%, and a voltage close to the input voltage, which is 24 V, is supplied to the fan, thereby increasing the rotation speed of the fan.

According to the present embodiment, without increasing the number of input signals, the output voltage is able to be switched between certain voltages with a simple circuit configuration. Specifically, the output voltage is able to be changed up to a voltage close to the input voltage by changing the pulse width of the FPWM signal. In addition, the voltage to be supplied to the load 200 is able to be changed minutely.

Second Embodiment

Figure 3:
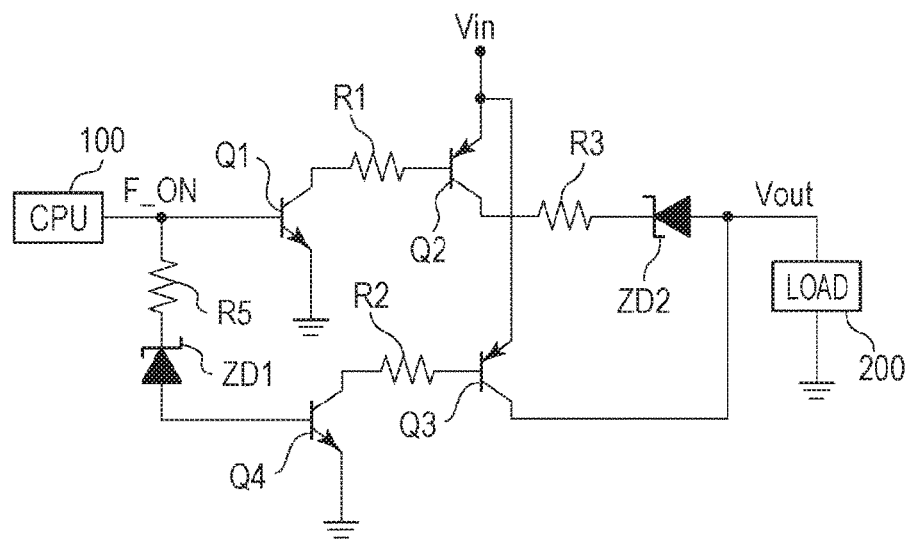
FIG. 3 is a circuit diagram of a step-down power supply according to a second embodiment.

FIG. 3 is a circuit diagram of a step-down power supply device according to a second embodiment. The difference between the second embodiment and the first embodiment is that the second embodiment is characterized in that a voltage level signal F_ON (hereinafter referred to as F_ON signal) is output as a signal output by a CPU 100, and the voltage of the F_ON signal is changed. As a result, the output voltage is able to be switched between two types of voltage: a voltage close to an input voltage, and a voltage lower than the input voltage. In FIG. 3, from the CPU 100 serving as an output-control-signal generation unit, an F_ON signal is output to a control terminal of a switching element Q1 and a resistor R5. The resistor R5 is connected between the CPU 100 and the cathode of a Zener diode ZD1, the cathode of the Zener diode ZD1 is connected to the resistor R5, and the anode of the Zener diode ZD1 is connected to a control terminal of a switching element Q4. This is provided to adjust a voltage at which a second switch circuit is switched on using a Zener diode breakdown voltage.

In the following, a circuit operation will be described. The CPU 100 serving as the output-control-signal generation unit stores, in a ROM (not illustrated), a control table in which information indicating voltage levels corresponding to setting voltages is stored. Furthermore, the CPU 100 includes a conversion processing unit that reads out information indicating a voltage level from the control table and performs D/A conversion. The CPU 100 outputs a result of D/A conversion as an output control signal F_ON.

In the case where a voltage lower than the input voltage is to be output, the CPU 100 outputs an F_ON signal smaller than the breakdown voltage of the Zener diode ZD1. Here, the Zener diode ZD1 is not conducted, and a switching element Q3 and the switching element Q4 of the second switch circuit are not switched on. That is, the Zener diode ZD1 serves as a unit that adjusts the operation of the second switch circuit in accordance with an output control signal, which is the F_ON signal, from the CPU 100. In contrast, the switching element Q1 and a switching element Q2 of a first switch circuit, to which the F_ON signal is input, are switched on, a Zener diode ZD2 is conducted, and thereby a voltage with high voltage accuracy is output as an output voltage Vout.

In addition, in the case where a voltage close to an input-voltage level is to be output, the CPU 100 outputs an F_ON signal larger than the breakdown voltage of the Zener diode ZD1. Here, the Zener diode ZD1 is conducted, and the switching elements Q3 and Q4 of the second switch circuit are switched on. In contrast, the switching elements Q1 and Q2 of the first switch circuit, to which the F_ON signal is input, are switched on; however, a current does not flow through the switching element Q2 of the first switch circuit. As a result, a voltage close to the input-voltage level is output as the output voltage Vout from the switching element Q3 of the second switch circuit. This is because the resistor R3, a power restriction element, is provided on the power supply route of the first switch circuit, and the power supply route of the second switch circuit has a smaller impedance.

Figure 4:
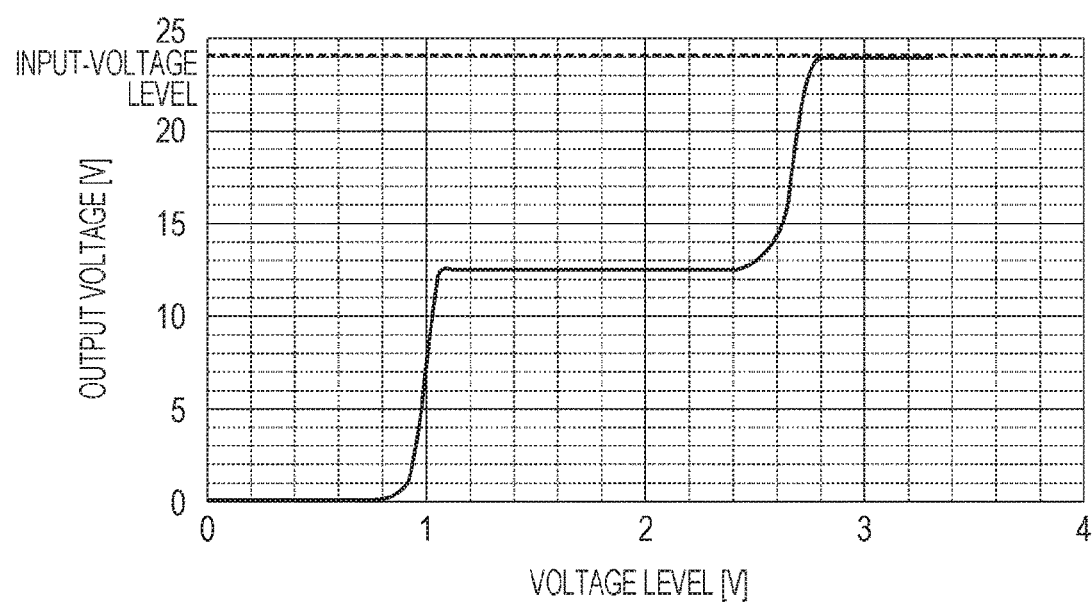
FIG. 4 is a diagram illustrating an output voltage obtained when the voltage level of a voltage level signal is changed in the power supply of the second embodiment.
Figure 5A:
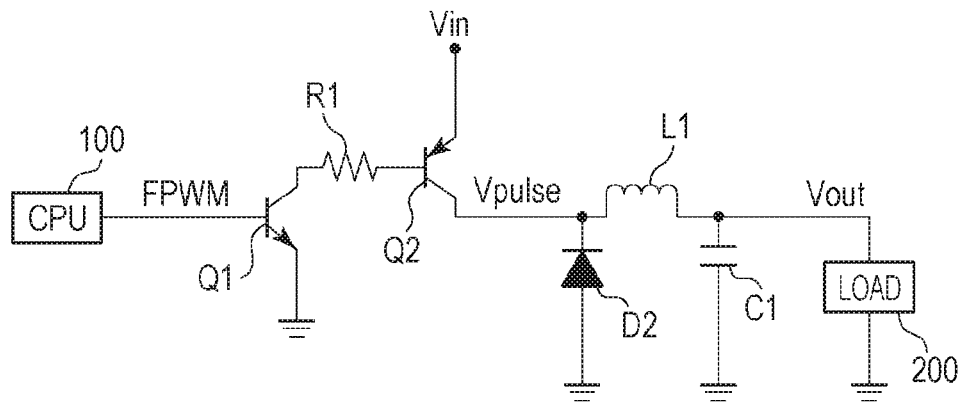
FIGS. 5A to 5C are circuit diagrams of conventional power supplies.
Figure 5B:
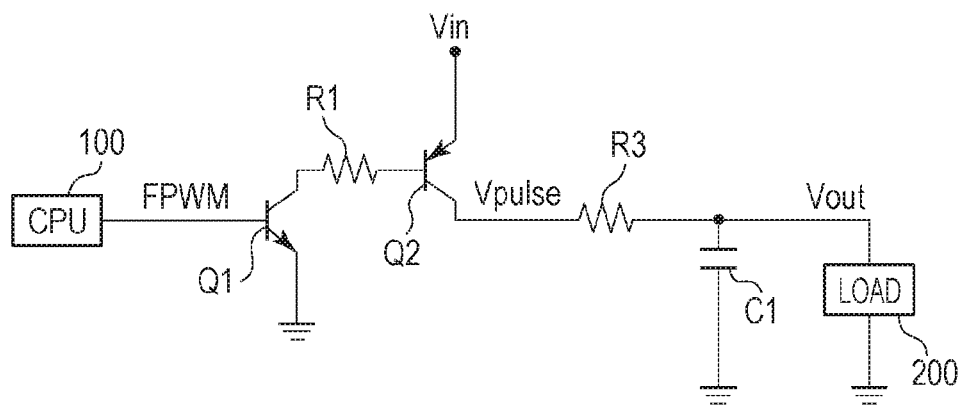
Figure 5C:
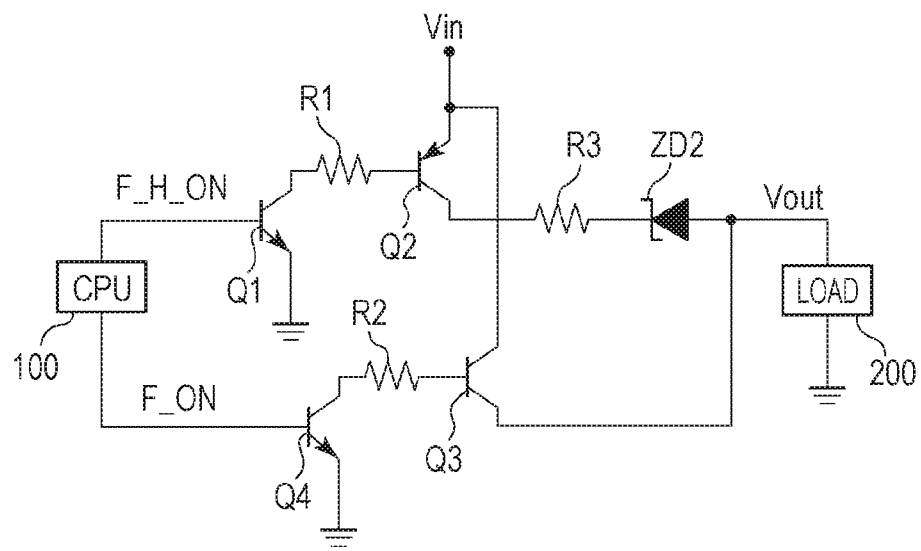

FIG. 4 is a diagram illustrating an output voltage obtained when the voltage level of the F_ON signal is changed in the circuit of the power supply device of the second embodiment. The horizontal axis represents the voltage level of the F_ON signal, and the vertical axis represents the output voltage Vout. This shows that the output voltage Vout increases as the voltage level of the F_ON signal increases. The switching elements Q1 and Q2 of the first switch circuit are switched on at the point in time when the voltage level exceeds approximately 1 V, and approximately 12 V is output. In addition, the switching elements Q3 and Q4 of the second switch circuit are switched on at the point in time when the voltage level exceeds approximately 2.6 V, and a voltage close to the input voltage, which is 24 V, is output.

For example, a fan that cools the inside of an apparatus is able to be applied as a load 200 in FIG. 3. The ON Duty of an FPWM signal is set to 20%, and approximately a voltage of 11 V is supplied to the fan, thereby reducing the rotation speed of the fan. In addition, in the case where the cooling function of the fan is prioritized, the ON Duty of the FPWM signal is set to 100%, and a voltage close to the input voltage, which is 24 V, is supplied to the fan, thereby increasing the rotation speed of the fan.

In the case where it is desired to reduce the sound of the fan, the voltage level of the F_ON signal is set to 1.8 V, and approximately a voltage of 12 V is supplied to the fan, thereby reducing the rotation speed of the fan. In addition, in the case where the cooling function of the fan is prioritized, the voltage level of the F_ON signal is set to 3.3 V, and a voltage close to the input voltage, which is 24 V, is supplied to the fan, thereby increasing the rotation speed of the fan.

According to the present embodiment, without increasing the number of input signals, the output voltage is able to be switched between certain voltages with a simple circuit configuration. Specifically, the output voltage is able to be switched between two types of voltage by changing the voltage of the F_ON signal, the two types of voltage including a voltage close to the input-voltage level and a voltage lower than the input-voltage level.

Note that, configurations using transistors as the switching elements Q1 to Q4 have been described in the above-described first and second embodiments; however, not only transistors but also field-effect transistors (also referred to as FETs) may be used.

(Application Example of Power Supply Device)

The power supply devices described in the above-described embodiments are each applicable as, for example, a low-voltage power supply for an image forming apparatus and as a power supply that supplies power to a driving unit such as a motor. In the following, the configuration of an image forming apparatus to which the power supply devices described in the above-described embodiments may be applied will be described.

[Configuration of Image Forming Apparatus]

Figure 6A:
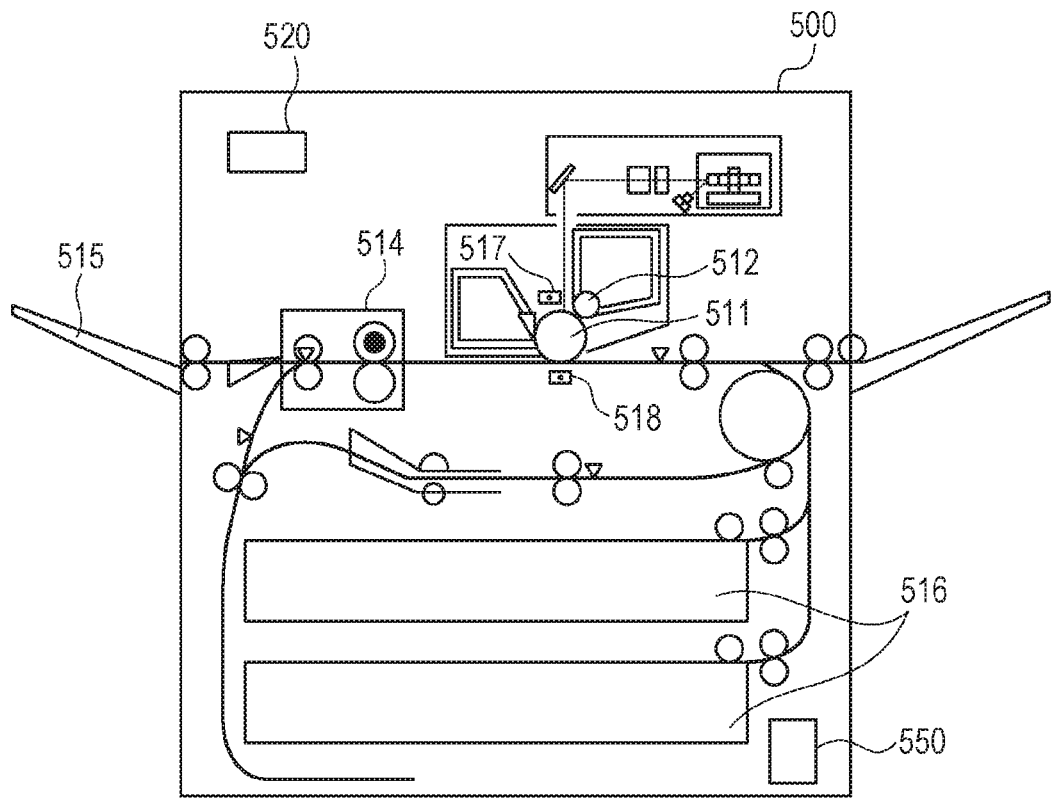
FIGS. 6A and 6B are diagrams illustrating an application example of a power supply of the present invention.
Figure 6B:
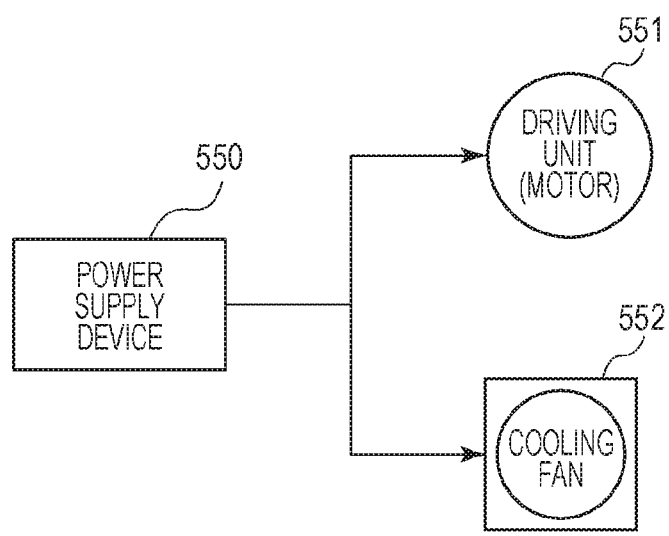

As an example of an image forming apparatus, a laser beam printer will be described as an example. FIGS. 6A and 6B illustrate a schematic configuration of a laser beam printer, which is an example of an electrophotographic printer. A laser beam printer 500 includes a photoconductive drum 511, a charge unit 517 (a charge unit), and a development unit 512 (a development unit). The photoconductive drum 511 serves as an image bearing member on which an electrostatic latent image is formed. The charge unit 517 charges the photoconductive drum 511 uniformly. The development unit 512 develops with toner the electrostatic latent image formed on the photoconductive drum 511. The toner image developed on the photoconductive drum 511 is then transferred by a transfer unit 518 (a transfer unit) onto a sheet (not illustrated) as a recording material supplied from a cassette 516, the toner image transferred to the sheet is fixed by a fuser 514, and the resulting sheet is discharged to a tray 515. The photoconductive drum 511, the charge unit 517, the development unit 512, and the transfer unit 518 are an image forming unit. In addition, the laser beam printer 500 includes a power supply device 550, which is described in the embodiments above. Note that an image forming apparatus to which power supply devices 550 described in the first and second embodiments are applicable is not limited to the one illustrated in FIGS. 6A and 6B, and may also be, for example, an image forming apparatus including a plurality of image forming units. Furthermore, the image forming apparatus to which the power supply devices 550 are applicable may also be an image forming apparatus including a primary transfer unit that transfers a toner image formed on the photoconductive drum 511 onto an intermediate transfer belt, and a secondary transfer unit that transfers the toner image formed on the intermediate transfer belt onto a sheet.

The laser beam printer 500 includes a controller 520 that controls an image forming operation performed by the image forming unit and a sheet conveyance operation. Each of the power supply devices 550 described in the above-described embodiments is able to supply power to, for example, a driving unit 551 such as a motor used to rotate the photoconductive drum 511 or used to drive various types of roller and the like that convey sheets. In addition, when the power supply device 550 is a device including a cooling fan 552 for cooling heat-producing portions inside the device, the rotation speed of the fan 552 is able to be changed as described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A power supply for supplying power to a load, the power supply comprising:
    a first switching unit configured to perform a switching operation to convert an input voltage to an output voltage, switching on and off being repeatedly performed in the switching operation in accordance with a control signal;
    a power restriction unit configured to input the control signal; and
    a second switching unit configured to input the control via the power restriction unit, and configured to perform switching on and off selectively in accordance with a control signal,
    wherein the second switching unit is in an off state in a case where a voltage value according to the control signal is smaller than a threshold value and switches to an on state from the off state in a case where a voltage value according to the control signal exceeds the threshold value.

2. The power supply according to claim 1,
    wherein the control signal is a pulse signal, and
    wherein in a case where an on period of the pulse signal exceeds a predetermined value, a voltage input to the power restriction unit exceeds the threshold value.

3. The power supply according to claim 2, further comprising,
    a control unit configured to output the control signal,
    wherein the control unit stores data for changing an on period of the pulse signal.

4. The power supply according to claim 1,
    wherein the power restriction unit is a diode, and
    wherein the threshold value is a forward direction voltage of the diode.

5. The power supply according to claim 1, further comprising
    a circuit configured to convert a voltage to a direct current voltage,
    wherein the circuit is connected to the power restriction unit on a side from which the control signal is input.

6. The power supply according to claim 1, wherein the output voltage to be supplied to the load when the second switching unit is off state is smaller than the output voltage to be supplied to the load when the second switching unit is on state.

7. The power supply according to claim 1,
    wherein the load is a fan that rotates, and
    wherein a number of rotations of the fan in a case where the second switching unit is in the off state is less than a number of rotations of the fan in a case where the second switching unit is in the on state.

8. An image forming apparatus including an image forming unit for forming an image, the image forming apparatus comprising:
    a power supply configured to supply power to a load that operates in a case where an image is formed,
    wherein the power supply includes
    a first switching unit configured to perform a switching operation to convert the input voltage, switching on and off being repeatedly performed in the switching operation in accordance with a control signal;
    a power restriction unit configured to be input the control signal; and
    a second switching unit configured to be input the control via the power restriction unit, and configured to perform switching on and off selectively in accordance with a control signal;
    wherein the second switching unit is in an off state in a case where a voltage value according to the control signal is smaller than a threshold value and switches to an on state from the off state in a case where a voltage value according to the control signal exceeds the threshold value.

9. The image forming apparatus according to claim 8,
    wherein the control signal is a pulse signal, and
    wherein in a case where an on period of the pulse signal exceeds a predetermined value, a voltage input to the power restriction unit exceeds the threshold value.

10. The image forming apparatus according to claim 9, further comprising a control unit configured to output the control signal,
    wherein the control unit stores data for changing an on period of the pulse signal.

11. The image forming apparatus according to claim 10,
    wherein the power restriction unit is a diode, and
    wherein the threshold value is a forward direction voltage of the diode.

12. The image forming apparatus according to claim 8, further comprising a circuit configured to convert a voltage to a direct current voltage,
    wherein the circuit is connected to the power restriction unit on a side from which the control signal is input.

13. The image forming apparatus according to claim 8, wherein the output voltage to be supplied to the load when the second switching unit is off state is smaller than the output voltage to be supplied to the load when the second switching unit is on state.

14. The image forming apparatus according to claim 8,
    wherein the load is a fan that rotates for cooling an inside of the image forming apparatus, and wherein a number of rotations of the fan in a case where the second switching unit is in the off state is less than a number of rotations of the fan in a case where the second switching unit is in the on state.

15. The image forming apparatus according to claim 8, further comprising a control unit configured to control an operation of the image forming apparatus,
wherein the control unit outputs the control signal.

* * * * *